Nov. 5, 1957  W. G. WADEY  2,811,890
METHOD FOR TESTING PHOTO-ELECTRIC SURFACES
Filed Dec. 19, 1952

INVENTOR.
WALTER G. WADEY
BY
ATTORNEYS

United States Patent Office 2,811,890
Patented Nov. 5, 1957

2,811,890
METHOD FOR TESTING PHOTO-ELECTRIC SURFACES

Walter G. Wadey, Hamden, Conn., assignor, by mesne assignments, to the United States of America as represented by the Secretary of the Navy Application December 19, 1952, Serial No. 327,011

1 Claim. (Cl. 88—14)

This invention relates to a method and means for testing the sensitivity of photo-electric surfaces and is directed particularly to a method and means for determining the sensitivity of photo-electric surfaces from point-to-point in fine detail.

Heretofore the sensitivity of photo-electric devices was determined by subjecting the entire photo-electric surface to light of particular spectral characteristics and intensity and measuring the current thereby produced. Such a method determined the average sensitivity of a photo-electric device but provided no information on variations of sensitivity from point-to-point on its sensitive surface.

In certain applications of photo-electric devices, for instance in their use with scintillation crystals for counting radiation particles and quanta, it is necessary that the photo-electric surface be of uniform sensitivtiy in order that accurate energy measurements can be obtained. Accordingly, it is the primary object of this invention to provide a method and means for evaluating the point-to-point sensitivity of the active surface of photo-electric devices so that particular photo-electric units having the specified uniformity of sensitivity required in such applications can be selected.

Another object of this invention is to provide a method and means for accumulating discrete sensitivity data on the basis of which improvements in the design and manufacture of photo-electric devices can be achieved.

A further object is to provide a method and means of the character described for conveniently testing photo-electric devices in production.

Other objects and many of the attendant advantages of this invention will readily be appreciated as the same becomes better understood by reference to the following description when considered in connection with the accompanying drawings wherein.

In brief, the invention comprises the utilization of a flying-spot scanner for producing a small spot of light that will sweep out strips of an area in regular progression together with a suitable optical coupling to sweep the spot of light (the area of which is small compared with the photo-surface area), across the photo-surface in successive strips so as to illuminate only a small area at one instant, but so that the entire area will have been illuminated, bit-by-bit, after the entire sweep is completed. The electric output of the photo-electric device is amplified and suitably presented or recorded. The variations in sensitivity of the photo-surface from point-to-point are represented by fluctuations of the output voltage as indicated by the presentation or recording device.

Figure 1:
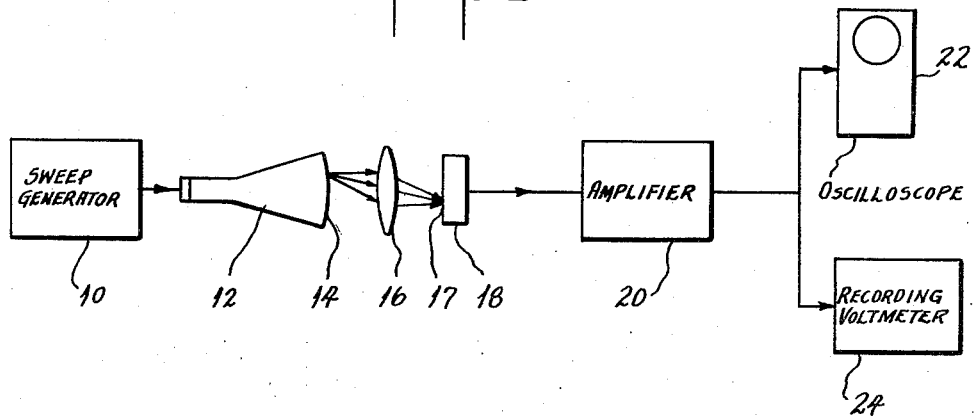
Fig. 1 is a block diagram of the apparatus comprising the invention.
Figure 2:
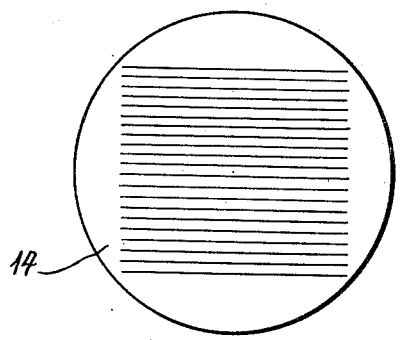
Fig. 2 is a representation of the face of the cathode-ray tube of Fig. 1 illustrating a typical scanning pattern of the electron beam for producing a moving spot of light on the surface of the photo-electric device being tested.

In Fig. 1 the numeral 10 designates a sweep generator coupled to a cathode-ray tube 12 having a presentation screen 14 of short persistance. The sweep generator 10 is preferably of the type producing a linear horizontal scan, progressive from top to bottom, as illustrated in Fig. 2, although other sweep patterns, such as a spiral sweep, could be used. A lens 16 is provided to focus the moving spot of light from the screen 14 on the photosensitive surface 17 of the photo-electric device 18 being tested. Thus, as the cathode-ray tube spot sweeps across successive strips of its screen 14, a spot of light is made to sweep out a similar pattern on the photo-sensitive surface 17 of the photo-electric device. The output voltage or signal voltage of the photo-electric device is fed into a suitable voltage amplifier 20, and the amplified signal is connected either to an oscilloscope 22 for visual presentation, or to a recording voltmeter 24 for production of a permanent graphic record. The voltage fluctuation data thus presented, being dependent upon the point to point sensitivity of the photo-sensitive surface, provide information enabling a judgment to be made of the average sensitivity of the photo-surface, and of the variations of sensitivity of the photo-surface from point to point.

Obviously, many modifications and variations of the present invention are possible in the light of the above teachings. It is therefore to be understood that within the scope of the appended claim, the invention can be practiced otherwise than as specifically described.

I claim:

The method of analyzing the sensitivity of a photo-electric device comprising the steps of scanning the electron beam of a cathode-ray tube to produce a laterally moving, vertically progressive scan of a spot of light of uniform intensity on the presentation screen of such tube, focussing said scan of light on the presentation screen over the photosensitive surface of the photoelectric device in a laterally moving, vertically-progressive scan to illuminate successive strips of small area of the photosensitive surface, and continuously measuring the output current of the photoelectric device caused by the focused light so moved, whereby fluctuation in the output current of said photoelectric device is an indication of the point-to-point sensitivity of the photoelectric surface of said photoelectric device.

References Cited in the file of this patent

UNITED STATES PATENTS

| | | |
|---|---|---|
| 2,293,899 | Hanson | Aug. 25, 1942 |
| 2,460,471 | Schade | Feb. 1, 1949 |
| 2,462,263 | Haynes | Feb. 22, 1949 |
| 2,467,057 | Simmon | Apr. 12, 1949 |
| 2,472,889 | Dumont | June 14, 1949 |
| 2,523,328 | Ranks | Sept. 26, 1950 |
| 2,625,602 | Somers | Jan. 13, 1953 |
| 2,648,723 | Goldsmith | Aug. 11, 1953 |

FOREIGN PATENTS

| | | |
|---|---|---|
| 545,469 | Great Britain | May 28, 1942 |

OTHER REFERENCES

Zworykin and Ramberg Text on "Photoelectricity," published 1949, Wiley and Sons Inc., page 367.